No. 610,232. Patented Sept. 6, 1898.
H. GANSWINDT.
BEARING FOR ROTARY DISKS.
(Application filed Mar. 1, 1898.)
(No Model.)
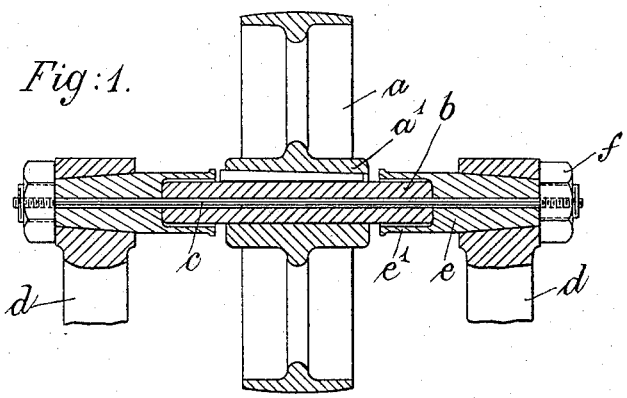
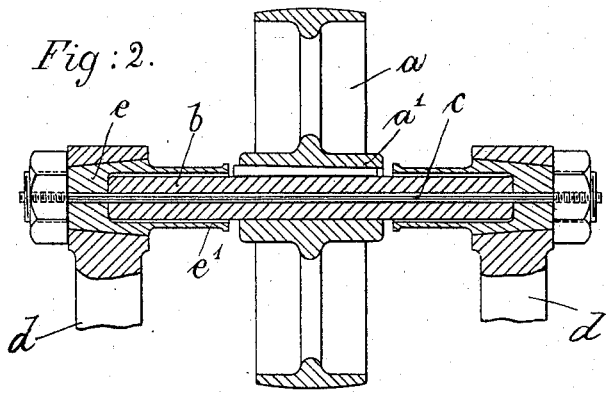
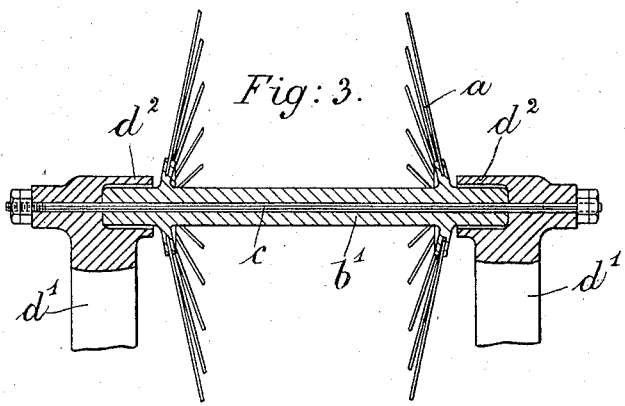
Witnesses:
Inventor:
Hermann Ganswindt
By Richardson
his Attorneys

UNITED STATES PATENT OFFICE.

HERMANN GANSWINDT, OF MARIENDORFER WEG, SCHOENEBERG, GERMANY.

BEARING FOR ROTARY DISKS.

SPECIFICATION forming part of Letters Patent No. 610,232, dated September 6, 1898.

Application filed March 1, 1898. Serial No. 672,149. (No model.)

*To all whom it may concern:*

Be it known that I, HERMANN GANSWINDT, manufacturer, a subject of the Emperor of Germany, and a resident of Mariendorfer Weg, Schoeneberg, near Berlin, in the Empire of Germany, have invented certain new and useful Improvements in Bearings for Rotary Disks, Wheels, and the Like, of which the following is an exact, full, and clear description.

This invention relates to a peculiar kind of bearing for rotary disks, wheels, and the like, its object being to limit, without the employment of antifriction balls or rollers, the friction arising from the movement of the disks, wheels, and the like to the lowest degree in such manner that the axle on which the disk or wheel rotates is rigidly connected at its ends with supports, so that it is only subjected to shearing and not to flexure.

With the great shearing strength, for instance, of string-wire made from crucible cast-steel even an axle of very small diameter is adapted to receive heavily-loaded disks and wheels. Owing to the small diameter of the axle the friction is extraordinarily reduced and a very light and non-resisting rotary movement is attained.

Practical experiments have shown that an iron disk of about eighty-eight kilograms in weight and mounted upon pianoforte-string-steel wire of four millimeters in diameter rotates longer at an initial velocity of about one hundred and twenty revolutions per minute than upon the best ball-bearings, whereas on mounting the same disk on wires of two and one millimeters, respectively, in diameter the period of rotation increases to about the double and fourfold, respectively, and even on the arrangement being roughly constructed without lubricator.

This invention is adapted to dispense with all the known disadvantages experienced with ball-bearings, such as caused by the varying diameter or irregular wearing and tearing of the balls or rollers.

Referring to the accompanying drawings, Figure 1 is a sectional view of the construction of the bearing of a rotary wheel. Fig. 2 is a modification of the construction shown in Fig. 1. Fig. 3 is a sectional view of a further modification adapted for cycle-wheels.

The disk, wheel, or any other rotary body $a$ to be mounted is keyed or otherwise firmly secured with its hub to a sleeve $b$, preferably made of chilled or tempered steel. This sleeve $b$ has a central boring for receiving the wire $c$ which forms the axle, the ends of such wire being firmly secured in supporting-arms $d$ by means of nuts or in any other suitable manner. In consequence of the small cross-section of the wire, which possesses great shearing strength and is made of the best crucible cast-steel or the like, the friction between the sleeve $b$ and the wire is very slight, and the movement of the disk $a$ or other body is effected with the least possible resistance.

In order that the "dangerous cross-section" where the wire $c$ is subjected to shearing—viz., at the ends of the sleeve $b$—may be guarded in such manner that in case of the wire breaking—for instance, in consequence of a jerk or the like—the rotating body, with its hub or sleeve $b$, is maintained in position. Sleeves or blocks $e$ are secured in the supporting arms or brackets $d$ by means of nuts $f$, provided with borings or holes through which the ends of the wire $c$ pass, in order to receive the nuts (not shown) by which the wire is secured.

The sleeves or blocks $e$ are provided with bell-shaped projections $e'$, extending beyond the ends of the sleeve $b$, without, however, coming in contact therewith.

According to the modification of Fig. 2 the dangerous cross-sections coinciding with the ends of the sleeve $b$ are situated in the central axes of the supporting arms or brackets $d$, in order that the wire shaft will not be subjected to any flexure whatever.

Fig. 3 is a sectional view of a modification specially adapted for cycle-wheels. In this case the sleeve $b'$, through which the wire shaft $c$ passes, forms the hub of the wheel, and the supports or brackets $d'$ are provided with borings or recesses forming bell-shaped casings $d^2$ for the ends of such sleeve, so that the same is secured in like manner as described in respect of the foregoing modifications.

If for some reason the wire $c$, upon which the disk, wheel, or other body with the sleeve $b$ or $b'$ rotates, should break, the sleeves $e$ or brackets $d'$, with their bell-shaped parts $e'$ or casing $d^2$, respectively sustain the ends of the sleeve $b$ or $b'$ and keep the rotary body in position. The bell-shaped parts $e'$ may also be arranged on the sleeve $b$, or they can be dispensed with on employing a wire of sufficient shearing strength.

Having now particularly described and ascertained the nature of the said invention, I declare that what I claim, and wish to secure by Letters Patent, is—

1. In combination with a rotary body, a sleeve connected therewith, a wire shaft of small sectional area passing through the said sleeve, bell-shaped parts at the ends of the sleeve and the supports at the ends of the sleeves, substantially as described.

2. In combination with a rotary body, a sleeve connected therewith, a wire shaft of small sectional area passing through the said sleeve, and the supports at the ends of the sleeves having blocks therein carrying bell-shaped parts, substantially as described.

In witness whereof I have hereunto set my hand in presence of two witnesses.

HERMANN GANSWINDT.

Witnesses:
 FRANZ KOLLM,
 C. H. DAY.